United States Patent [19]
Kim

[11] Patent Number: 6,003,798
[45] Date of Patent: Dec. 21, 1999

[54] ADJUSTABLE BRAKE FOR BAITCAST REEL

[75] Inventor: Hyunkyu Kim, Broken Arrow, Okla.

[73] Assignee: Zebco Division of Brunswick Corporation, Tulsa, Okla.

[21] Appl. No.: 08/971,068

[22] Filed: Nov. 14, 1997

[51] Int. Cl.$^6$ .................................................. A01K 89/02
[52] U.S. Cl. ..................... 242/289; 242/288; 242/301; 188/181 A; 188/180; 188/184; 188/185; 188/189
[58] Field of Search ..................................... 242/289, 288, 242/301; 188/181 A, 180, 184, 185, 189

[56] References Cited

U.S. PATENT DOCUMENTS

| | | | |
|---|---|---|---|
| 2,482,863 | 9/1949 | Nelson | 242/289 |
| 3,986,678 | 10/1976 | Coquelet et al. | 242/289 |
| 5,108,042 | 4/1992 | Puryear et al. . | |
| 5,118,049 | 6/1992 | Roberts et al. . | |
| 5,217,182 | 6/1993 | Puryear et al. . | |
| 5,257,753 | 11/1993 | Sato . | |
| 5,301,899 | 4/1994 | Sato . | |
| 5,305,967 | 4/1994 | Sato . | |
| 5,308,021 | 5/1994 | Ikuta . | |
| 5,344,098 | 9/1994 | Roberts . | |
| 5,803,385 | 9/1998 | Baisch | 242/289 |

*Primary Examiner*—Donald P. Walsh
*Attorney, Agent, or Firm*—Fellers, Snider, Blankenship, Bailey & Tippens

[57] ABSTRACT

A braking apparatus for a fishing reel and a braking element assembly preferred for use in the inventive apparatus. The inventive braking apparatus comprises: a contacting structure; a plurality of braking elements for contacting the contacting structure to generate a braking force; a dial and cam slider assembly for selectively placing the contacting structure in a plurality of predetermined positions relative to the braking elements; and an indexing structure for identifying the predetermined positions. The inventive braking element assembly preferably comprises: (a) a housing having a longitudinal axis and a longitudinal end and (b) a plurality of braking elements retained in the housing for radial braking movement relative to the longitudinal axis. A first and second one of the braking elements are each retained in the housing at a first longitudinal position spaced a first longitudinal distance from the first end. A third one and a fourth one of the braking elements are each retained in the housing at a second longitudinal position spaced a second longitudinal distance from the longitudinal end. The second longitudinal distance is greater than the first longitudinal distance.

18 Claims, 7 Drawing Sheets

ADJUSTABLE BRAKE FOR BAITCAST REEL

FIELD OF THE INVENTION

The present invention relates to braking systems for fishing reels. More particularly, but not by way of limitation, the present invention relates to adjustable, centrifuigal braking systems for baitcast fishing reels.

BACKGROUND OF THE INVENTION

Baitcast fishing reels are well known in the art. A baitcasting reel will typically comprise: a split frame having a pair of opposing side plates; a foot extending from the frame for attaching the reel to a fishing rod; a line spool, rotatably positioned between the frame side plates, for retrieving and holding a fishing line; a spool shaft, on which the spool is secured, having ends extending through the frame side plates; a pinion gear (typically a helical gear) provided on the spool shaft; a manually rotatable crank handle; a gear train and crankshaft assembly mechanically linking the crank handle to the spool shaft pinion gear; a level-wind mechanism which transverses the spool during winding to ensure that the fishing line is properly wound along the length of the spool; an anti-reverse mechanism for preventing reverse rotation of the crank handle and spool; a clutch mechanism for disengaging the pinion gear from the spool shaft to allow the spool to rotate freely during casting; an exterior actuator (typically a thumb lever) for engaging the clutch; and a spool drag or spool braking mechanism.

In most cases, right and left side covers are removably attached to the frame side plates for housing the reel's various operating mechanisms. A right-handed baitcasting reel (i.e., a reel designed for a right-handed user) will typically be structured such that: the spool drag or spool braking mechanism is housed under the left side cover; the crank handle is rotatably mounted outside of the right side cover; and the crankshaft, gear train, pinion gear, clutch, and anti-reverse mechanism are housed under the right side cover. As will be understood by those skilled in the art, a left-handed version of generally any baitcasting reel can be produced by simply reversing the arrangement and structure of the reel's components such that the left-handed reel is a mirror image of the right-handed version of the reel.

Two basic styles of reels dominate the baitcasting market. One type consists of traditional baitcasting reels having high, round profiles. The other type consists of low profile, contemporary reels having teardrop or generally oval shapes. As used herein, the term "high profile" refers to a reel profile wherein, when the reel is secured to a fishing rod, the spacing of the top of the reel above the top of the rod is relatively high. The term "low profile," as used herein, refers to a reel profile wherein the spacing of the top of the reel above the top of the rod is relatively low.

The low profile nature of the contemporary baitcasting reel desirably allows the user to "palm" the reel during winding. When palming the fishing reel, the user positions one hand around both the reel and the rod and turns the crank handle with the other hand. Many users find that holding the rod and reel in this manner provides comfort and balance. While palming the reel, the user will also typically hold the fishing line such that, during winding, the line passes between the thumb and the forefinger of the palming hand. Thus, palming also serves to remove moisture from the line and, by maintaining a desirable amount of tension on the line, promotes efficient winding.

Spool drag or spool braking systems are commonly used in baitcasting reels to alleviate line backlashing (also referred to as "line nesting") problems. Because they utilize transversely-oriented spools which rotate during casting, baitcasting reels are more prone to backlashing problems than are spinning reels and spin-casting reels. Such problems result primarily from the rotational momentum carried by the spool. The most common types of drag/braking mechanisms used in baitcasting reels are magnetic drag systems and centrifugal braking systems.

U.S. Pat. No. 5,108,042 discloses an adjustable, magnetic drag mechanism housed within the left side cover of a right-handed baitcast reel. The mechanism operates by exerting a magnetic drag force on the left end of the reel spool. The magnetic force slows the rotation of the spool during casting. The U.S. Pat. No. 5,108,042 mechanism comprises: a magnet carrier ring having a plurality of permanent magnets attached thereto; an axially movable cam disc to which the magnet carrier ring is secured; and an adjustment dial projecting through a recess in the left cover. The dial is operatively associated with the cam disc for selectively moving the carrier ring toward and away from the left end of the spool in order to adjust the amount of magnetic drag force applied to the spool.

Unfortunately, the amount of drag force imparted by this type of magnetic system does not vary in proportion to the rotational speed of the spool. Rather, for any selected magnet position, the system imparts a constant magnetic dragging force. Thus, for example, when the user has been casting a short distance and then decides to cast a long distance, the user must either adjust the magnetic drag system prior to making the long cast or compensate the magnetic force by applying thumb pressure to the reel spool.

U.S. Pat. No. 5,308,021 discloses a centrifugal braking system commonly used in baitcasting reels. The centrifugal braking system includes: a plurality of rod-like members projecting radially from the end of the spool shaft; a plurality of tubular braking pieces or weights slidably mounted on the rod-like members; and a fixed brake ring encompassing the distal ends of the rod-like members. When the spool shaft rotates, the braking pieces move outwardly on the rodlike members into frictional contact with the brake ring. This frictional contact provides a braking force which slows the rotation of the spool.

The centrifugal braking system desirably exerts a braking force which varies in proportion to the rotational speed of the spool. Unfortunately, however, to make even minor adjustments to the centrifugal system (e.g., to account for the use of a heavier or lighter lure), the left side of the reel must be disassembled and the individual braking pieces must be individually manipulated. Typically, the individual pieces can be snapped into fixed position adjacent the spool shaft whereby the pieces are prevented from sliding into frictional contact with the brake disc. Alternatively, the individual braking pieces can be either replaced or removed.

In addition to such adjustment problems, centrifugal braking assemblies of the type used in U.S. Pat. No. 5,308, 021 (a) require a relatively large amount of space, (b) are easily damaged (e.g., by bending the rods while making system adjustments), and (c) can easily become unbalanced.

U.S. Pat. No. 5,308,021 discloses a centrifugal braking system wherein the braking force exerted by the system can be selectively adjusted by operating a dial mechanism positioned under the left cover of the reel. Like the standard centrifugal braking system discussed above, the U.S. Pat. No. 5,308,021 system utilizes a plurality of individual, tubular, braking pieces slidably mounted on radial, rod-like members projecting from the end of the spool shaft.

However, rather than using a fixed braking ring, the U.S. Pat. No. 5,308,021 system employs an axially movable braking structure. Additionally, rather than having a strictly cylindrical braking surface, the U.S. Pat. No. 5,308,021 braking structure presents a frusto-conical braking surface which diverges toward a small diameter, cylindrical braking surface. Further, the roughness of the braking surface varies such that the frictional coefficient presented by the surface increases as the surface is adjusted axially toward the braking elements. Thus, the degree of frictional braking force provided by the U.S. Pat. No. 5,308,021 system can be adjusted by changing the point of contact between the braking structure and the braking pieces.

Unfortunately, the U.S. Pat. No. 5,308,021 system uses only a tubular-type braking element assembly and is therefore subject to the same space, damage, and balance problems discussed above. Further, unless the U.S. Pat. No. 5,308,021 reel is disassembled and the individual braking elements are either removed or locked into position adjacent to the spool shaft, the U.S. Pat. No. 5,308,021 system cannot be adjusted such that the individual braking pieces are completely prevented from contacting any portion of the braking surface. Moreover, the production of a braking surface of the type employed in U.S. Pat. No. 5,308,021 having a varying degree of roughness would be both difficult and costly.

The braking system of U.S. Pat. No. 5,308,021 is also likely to produce significant noise problems. Tubular braking elements of the type used in the U.S. Pat. No. 5,308,021 system will spin and wear when contacting either an inclined braking surface or a braking surface having a progressively increasing coefficient of friction. Such spinning and wear will likely cause the tubular braking elements to rattle. A substantial amount of rattle will likely also occur when the braking elements frictionally contact the rougher portions of the braking surface.

SUMMARY OF THE INVENTION

The present invention provides an adjustable braking apparatus. The present invention also provides a braking element assembly preferred for use in the inventive braking apparatus. The inventive braking apparatus and the inventive braking element assembly satisfy the needs and alleviate the problems mentioned above. As with other centrifugal braking systems, the inventive braking system provides a proportional braking force which desirably varies in relation to the rotational speed of the reel spool. However, the inventive system requires less space than previous systems and provides easy adjustment without disassembly and without having to remove the reel side cover. Additionally, in the inventive system, individual braking pieces can be taken completely out of braking position by means of simple external adjustment. Further, compared to prior tubulartype braking element assemblies, the inventive braking element assembly is sturdier, more stable, and much less susceptible to damage.

In one aspect, the inventive braking apparatus comprises: a contacting structure; a plurality of braking elements for contacting the contacting structure to generate a braking force; and placing means for placing the contacting structure in a plurality of predetermined positions relative to the braking elements. The inventive braking apparatus further comprises indexing means for identifying the predetermined positions.

In another aspect, the present invention provides a braking apparatus comprising: a contacting structure; a plurality of braking elements for contacting the contacting structure to generate a braking force; and placing means for selectively placing the contacting structure in a plurality of predetermined positions relative to the braking elements, the placing means including at least one cam ramp having a plurality of flats thereon corresponding to the predetermined positions.

In another aspect, the present invention provides a braking apparatus comprising (a) a contact member and (b) a plurality of braking elements having individual braking positions for contacting the contact member to thereby generate a frictional braking force. The braking elements are positioned about a rotational axis for radial braking movement. The contact member is movably mounted in a contemporary, low profile, baitcasting reel for positioning in at least a first location and a second location. The second location is different from the first location. When the contact member is positioned in the first location and the braking elements are in their individual braking positions, at least one of the braking elements contacts the contact member. However, when the contact member is positioned in the second position, said one braking element cannot contact the contact member regardless of whether said one braking element is in its individual braking position.

In another aspect, the present invention provides a braking apparatus comprising: a contacting structure; a plurality of braking elements for contacting the contacting structure to generate a braking force; and retaining means for retaining the braking elements about a rotational axis to allow radial braking movement of the braking elements. A first one of the braking elements has a first element longitudinal axis lying in a first plane substantially perpendicular to the rotational axis. A second one of the braking elements has a second longitudinal axis lying in the first plane. A third one of the braking elements has a third element longitudinal axis lying in a second plane substantially perpendicular to the rotational axis. A fourth one of the braking elements has a fourth element longitudinal axis lying in the second plane. The second plane is spaced apart from the first plane.

In another aspect, the present invention provides a braking element assembly for a fishing reel. The inventive braking element assembly comprises (a) a housing having a longitudinal axis and a longitudinal end and (b) a plurality of braking elements retained by the housing for radial braking movement relative to the longitudinal axis. A first and second one of the braking elements are each retained in the housing at substantially a first longitudinal position spaced a first longitudinal distance from the longitudinal end. A third one and a fourth one of the braking elements are each retained in the housing at substantially a second longitudinal position spaced a second longitudinal distance from the longitudinal end. The second longitudinal distance is greater than the first longitudinal distance.

In another aspect, the present invention provides a braking element assembly comprising a plurality of braking elements retained about an axis of rotation for radial braking movement. A first one and a second one of the braking elements are each retained at substantially a first axial position along the axis of rotation. A third one and a fourth one of the braking elements are each retained at substantially a second axial position along the axis of rotation. The second axial position is different from the first axial position.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Figure 1:
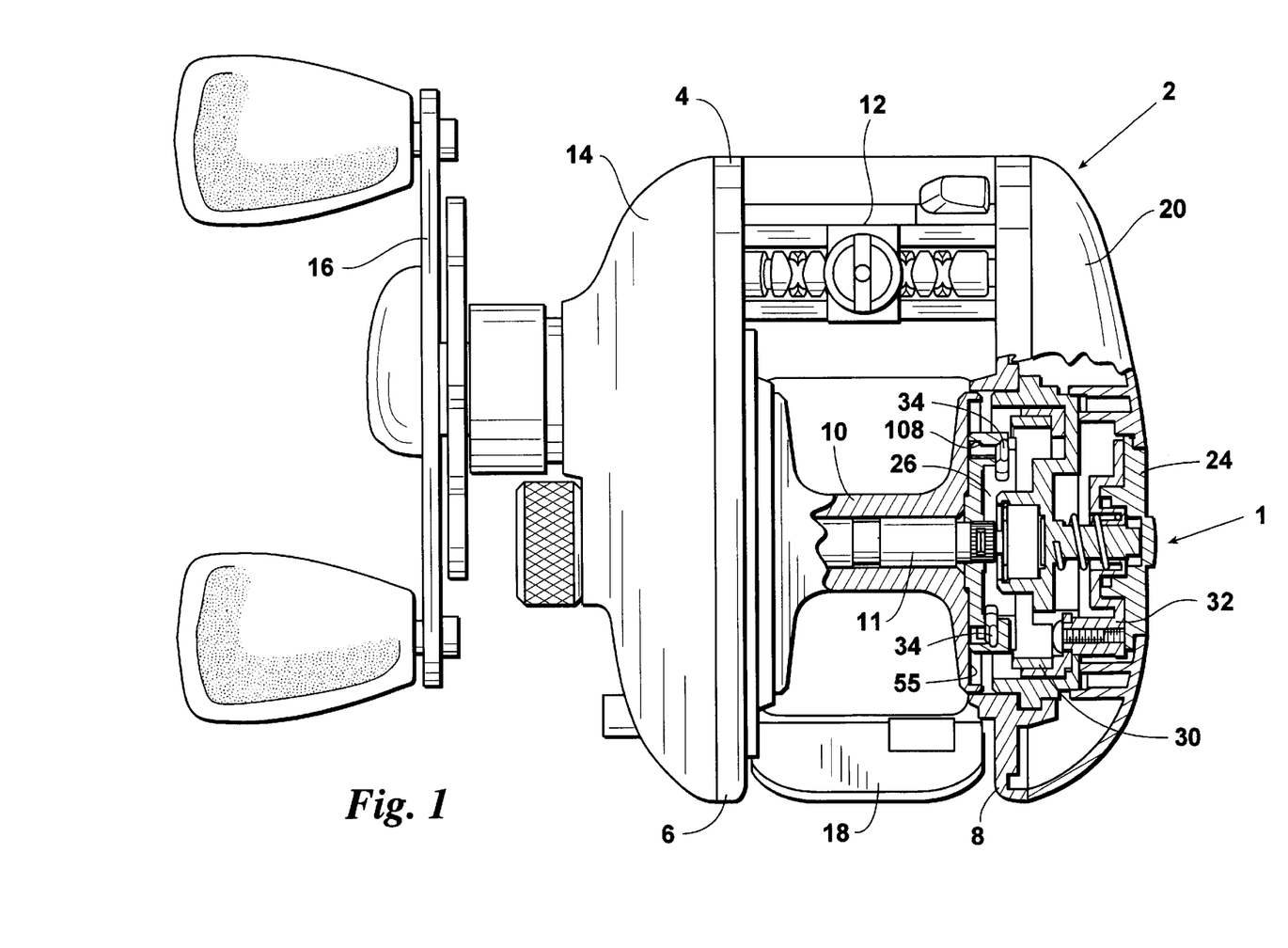
FIG. 1 provides a partially cutaway, elevational view of a baitcasting reel 2 having an embodiment 1 of the inventive braking apparatus installed therein.

Depicted in FIG. 1 is a left-handed baitcasting reel 2 incorporating a preferred embodiment 1 of the inventive, adjustable, centrifugal braking apparatus. Baitcasting reel 2 is a low-profile, contemporary, tear-drop shaped reel comprising: a split frame 4 having a left side plate 6 and a right side plate 8; a line spool 10 rotatably mounted in frame 4 between side plates 6 and 8; a spool shaft 11 extending through spool 10; a level-wind mechanism 12 which traverses the spool during winding to ensure that the line is properly wound along the entire length of the spool; a left side cover 14 secured over side plate 6; a crank handle 16, operably extending from left cover 14, for rotating spool 10; a reel foot (not shown) provided on the bottom of frame 4 for attaching reel 2 to a fishing rod; and a right side cover 20 secured over right side plate 8. Inventive braking apparatus 1 is housed within right side cover 20. When reel 2 is assembled, the only externally visible feature of inventive braking apparatus 1 is a brake dial 24 projecting through a circular aperture 26 formed in right cover 20.

Although, for convenience, the inventive apparatus is herein described as incorporated in a left-handed baitcasting reel, the inventive apparatus is equally adaptable for use in right-handed baitcasting reels.

Inventive braking apparatus 1 preferably comprises: brake dial 24; an inventive braking element assembly 28; a brake ring assembly 30; and a cam slider 32. Inventive brake element assembly 28 preferably comprises: a plurality of brake elements 34; a brake element housing 36; and a housing cover 38.

Figure 9:
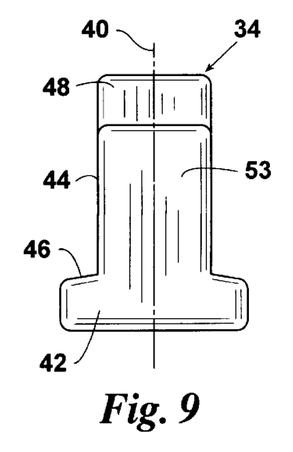
FIG. 9 provides an elevational rear view of a brake element 34 employed in brake element assembly 28.
Figure 10:
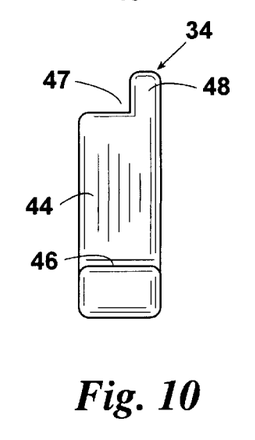
FIG. 10 provides an elevational side view of brake element 34.
Figure 11:
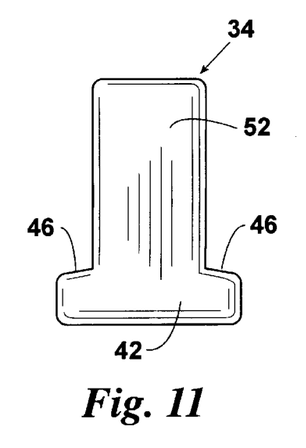
FIG. 11 provides an elevational front view of brake element 34.
Figure 12:
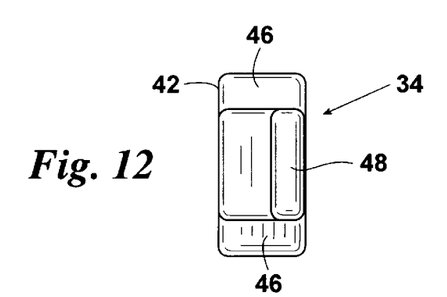
FIG. 12 provides a distal end view of brake element 34.

As depicted in FIGS. 9–11, each brake element 34 is preferably a T-shaped structure having: a longitudinal axis 40; a wide retaining end 42; an elongate portion 44 extending from retaining end 42; and a pair of retaining shoulders 46 defined by the transition from retaining end 42 to elongate portion 44. Elongate portion 44 has a tiered distal end 47 providing an outwardly projecting brake pad 48. To provide smooth transitional and braking contact, the edges of brake pads 48 are preferably rounded. Each braking element 34 preferably has both a flat forward surface 52 and a flat rearward surface 53.

As used herein, the terms "forward" and "forwardly facing" describe features facing and/or positioned away from end 55 of line spool 10. The terms "rearward" and "rearwardly facing," on the other hand, describe features facing and/or positioned toward end 55.

Figure 5:
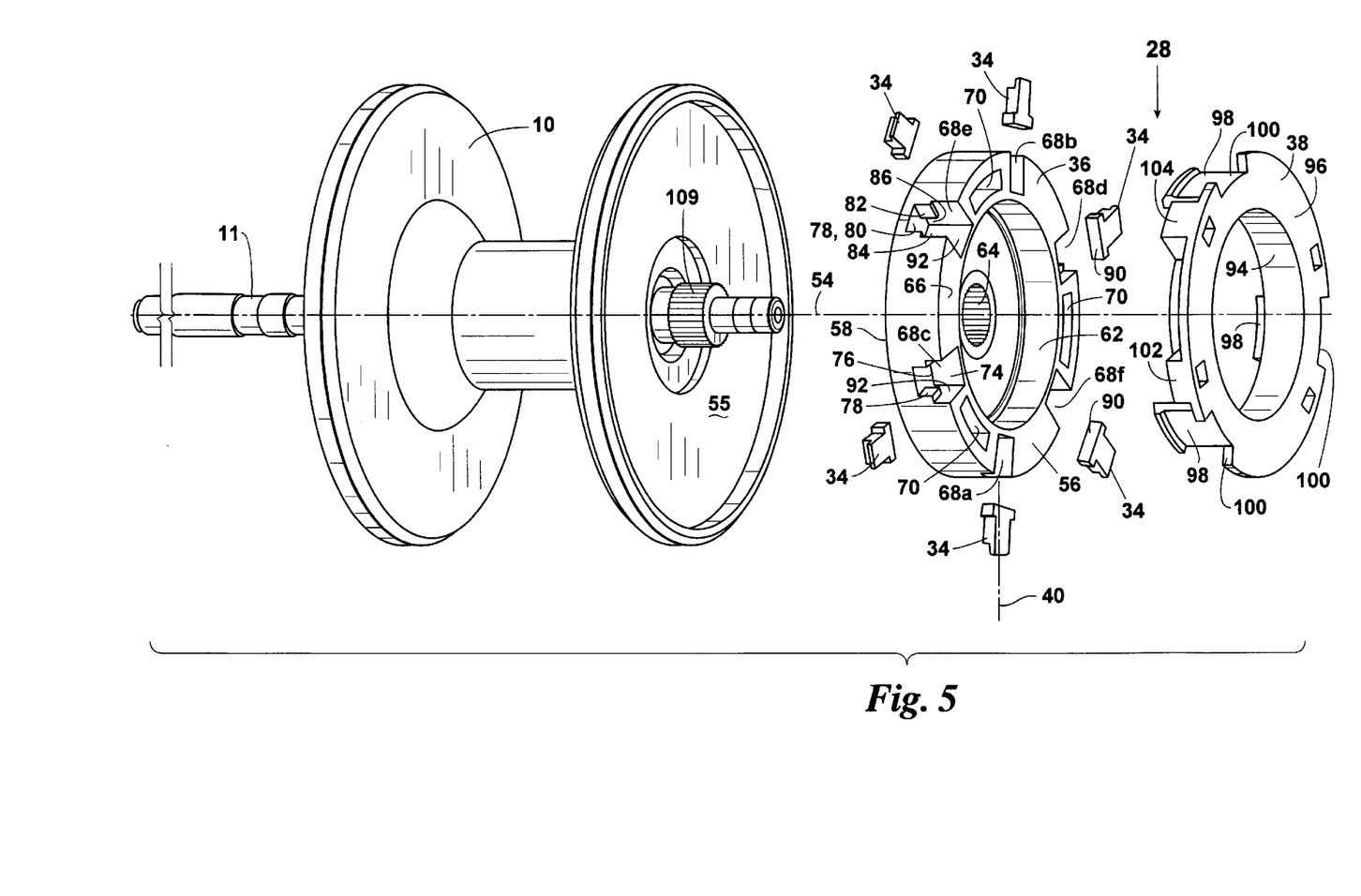
FIG. 5 provides an exploded perspective view of an inventive brake element assembly 28 employed in inventive braking apparatus 1.

Brake element housing 36 is preferably a substantially cylindrical member having: a longitudinal axis of rotation 54; a forward longitudinal end 56; a rearward longitudinal end 58; a cylindrical outer wall 60; a cylindrical bore 62 extending into forward end 56; a splined passage 64 extending from bore 62 through rearward end 58; a forward radial shoulder 66 extending between cylindrical outer wall 60 and cylindrical bore 62; and a plurality of radial slots 68a, 68b, 68c, 68d, 68e, and 68f for slidably holding brake elements 34. Housing 36 also includes a plurality of (preferably 3) chamfer slots 70. Chamfer slots 70 extend longitudinally through housing 36 and have openings provided in forward radial shoulder 66.

Radial slots 68a–f include: forward openings 74 provided in forward radial shoulder 66; outer openings 76 provided in outer wall 60; and substantially T-shaped segments 78. Brake elements 34 are slidably received in T-shaped segments 78 for reciprocating radial movement. Each T-shaped segment 78 comprises: a flat radial bottom surface 80; a narrow radial passage 82 extending into housing 36 from outer opening 76; a back wall 84 perpendicular to bottom surface 80; a wide inner segment 86 extending from narrow passage 82 to back wall 84; and a pair of longitudinally extending interior shoulders 88 defined by the transition from narrow passage 82 to inner segment 86. Narrow passages 82 are sized for slidably receiving the elongate portions 44 of brake elements 34. Inner segments 86 are sized for slidably receiving the wide retaining ends 42 of brake elements 34.

Each of slots 68a–f has a depth defined by the distance from forward radial shoulder 66 to the slot's bottom surface 80. Slots 68a–f are preferably evenly spaced around housing 36 and are preferably configured such that (a) slot 68a is diametrically opposed to, and of equal depth with, slot 68b, (b) slot 68c is diametrically opposed to, and of equal depth with, slot 68d, (c) slot 68e is diametrically opposed to, and of equal depth with, slot 68f, (d) the depth of slots 68c and 68d exceeds the depth of slots 68a and 68b, and (e) the depth of slots 68e and 68f exceeds the depth of slots 68c and 68d. As explained hereinbelow, the differing depths of slots 68a–f desirably allow a wide range of brake settings. Additionally, positioning slots 68a–f in the manner just described ensures balanced rotational operation of inventive brake element assembly 28.

Each of slots 68c, 68d, 68e, and 68f also includes a forward cavity 92 extending from forward radial shoulder 66 to T-shaped segment 78. Cavities 92 have substantially rectangular cross sections and are sized for receiving brake elements 34. Thus, brake elements 34 can be placed in, and removed from, T-shaped segments 78 by delivering brake elements 34 through cavities 92. The depth of the cavities 92 provided in slots 68e and 68f exceeds the depth of the cavities 92 provided in slots 68c and 68d.

Housing cover 38 comprises: a cylindrical ring 94; a flat, radial cap 96 extending outwardly from the forward end of ring 94; a plurality of (preferably 3) resilient chamfers 98 positioned outside of ring 94 and extending rearwardly from cap 96; a plurality of outer notches 100 provided in the perimeter of cap 96; a first pair of identical, diametrically opposed bosses 102 positioned outside of ring 94 and extending rearwardly from cap 96; and a second pair of identical, diametrically opposed bosses 104 positioned outside of ring 94 and extending rearwardly from cap 96. Bosses 104 project a greater distance from cap 96 than do bosses 102. Bosses 102 preferably have a size and shape corresponding to that of the forward cavities 92 of housing slots 68c and 68d. Bosses 104 preferably have a size and shape corresponding to that of the forward cavities 92 of housing slots 68e and 68f. Outer notches 100 are positioned adjacent the forward ends of chamfers 98 to facilitate the tooling/formation of chamfers 98.

Figure 6:
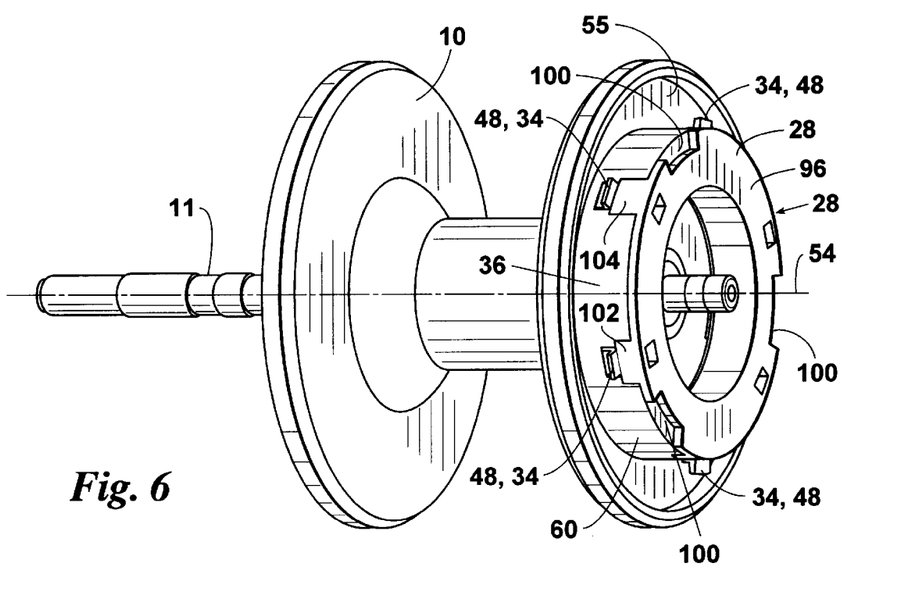
FIG. 6 provides an assembled perspective view of brake element assembly 28.
Figure 7:
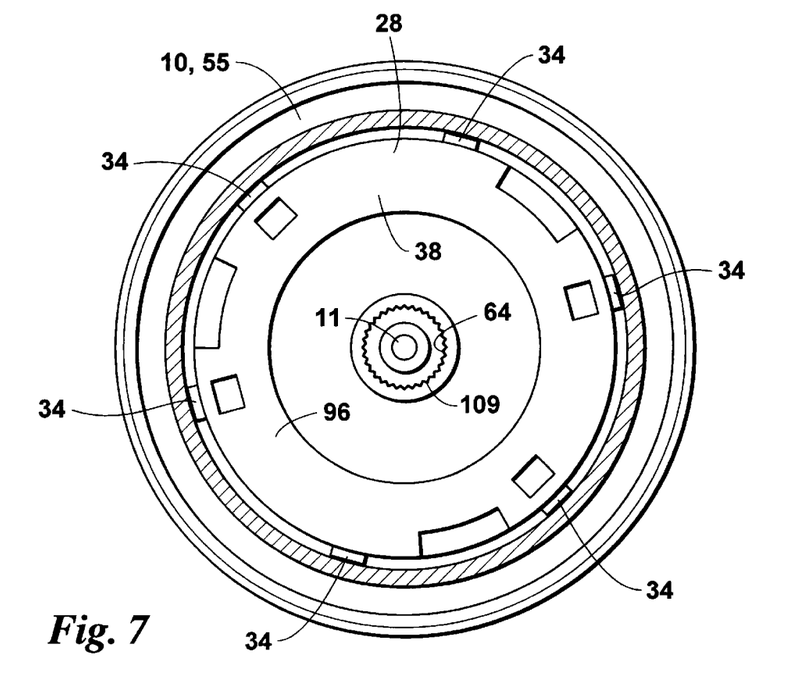
FIG. 7 provides an elevational front view of brake element assembly 28.
Figure 8:
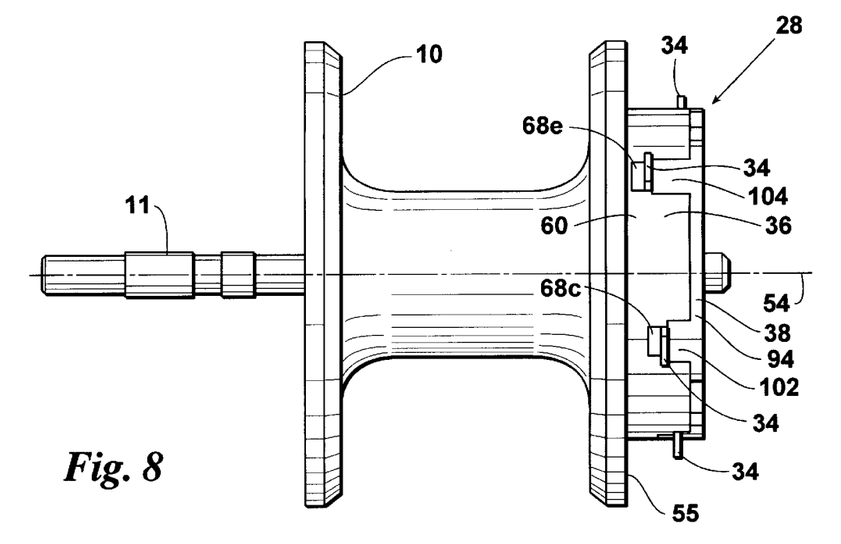
FIG. 8 provides an elevational side view of brake element assembly 28.

Housing cover 38 operably retains brake elements 34 in the T-shaped segments 78 of housing slots 68a–f. Housing cover 38 is removably attachable over the forward end 56 of housing 36 such that: (a) cover ring 94 is received in housing bore 62; (b) radial cap 96 covers the forward radial shoulder 66 of housing 36; (c) chamfers 98 are received in chamfer slots 70; (d) cover bosses 102 are held in, and preferably at least substantially fill, the forward cavities 92 of housing slots 68c and 68d; (e) cover bosses 104 are held in, and preferably at least substantially fill, forward cavities 92 of housing slots 68e and 68f; and (f) brake elements 34 are retained in slots 68a–f for sliding radial movement toward and away from housing axis 54. As chamfers 98 are delivered into chamfer slots 70, the ends of chamfers 98 snap into secure position over interior shoulders 108 provided in slots 70.

Braking element assembly 28 is secured in reel 2 such that assembly 28 rotates with spool 10. Splined passage 64 of housing 36 is operably received over an externally splined portion 109 of spool shaft 11. When secured in this manner, the rotational axis 54 of brake element assembly 28 is collinear with the rotational axis of spool 10.

When brake element assembly 28 rotates with spool shaft 11, the resulting centrifugal force imparted to brake elements 34 urges elements 34 to slide radially outward in slots 68 away from axis 54. Braking elements 34 are sized such that, at least when elements 34 slide into their outermost radial positions, brake pads 48 project from housing 36 through the slot openings 76 formed in outer wall 60. In embodiment 1 of the inventive braking apparatus, brake elements 34 must, at least at some point, project from openings 76 in order to operably interact with brake ring assembly 30.

The outward, radial braking movement of brake elements 34 in T-shaped segments 78 away from longitudinal axis 54 is limited by the abutment of brake element shoulders 46 with the interior radial ends of narrow slot passages 82. The inward sliding radial movement of brake elements 34 toward axis 54 is limited by the abutment of the ends 90 of brake elements 34 with slot walls 84.

Figure 2:
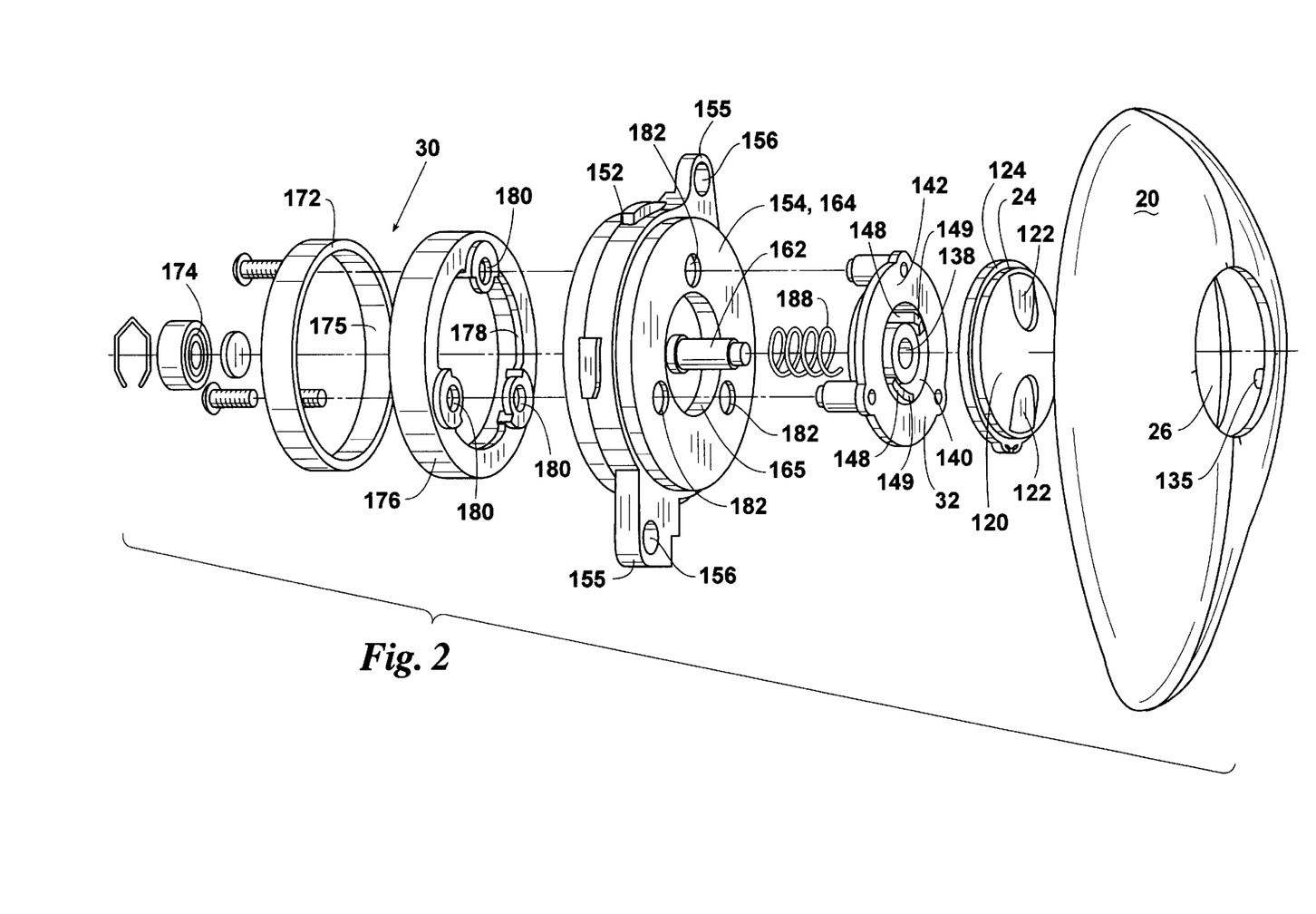
FIG. 2 provides a first exploded perspective view of the right side cover assembly of reel 2.
Figure 3:
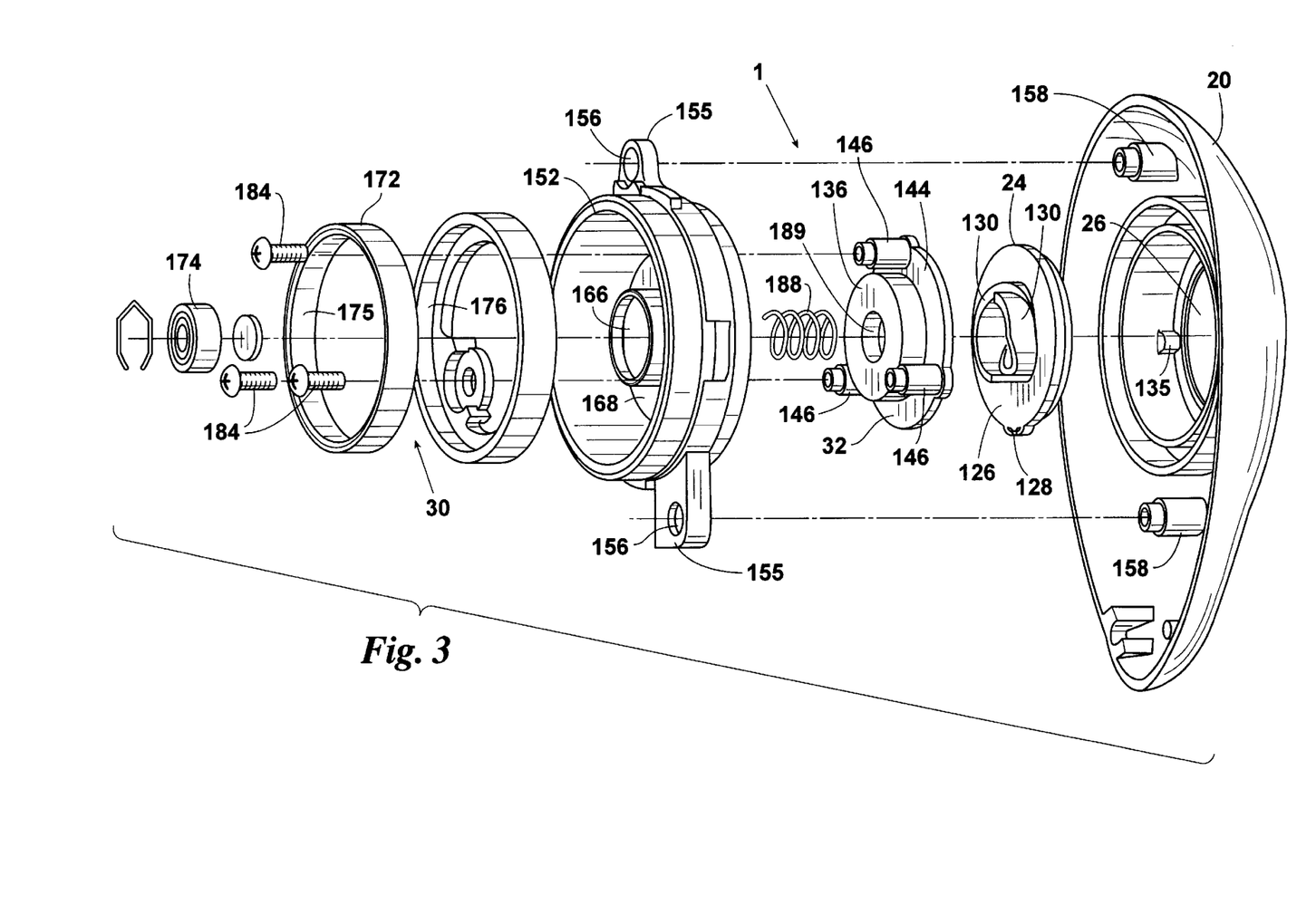
FIG. 3 provides a second exploded perspective view of the right side cover assembly of reel 2.
Figure 4:
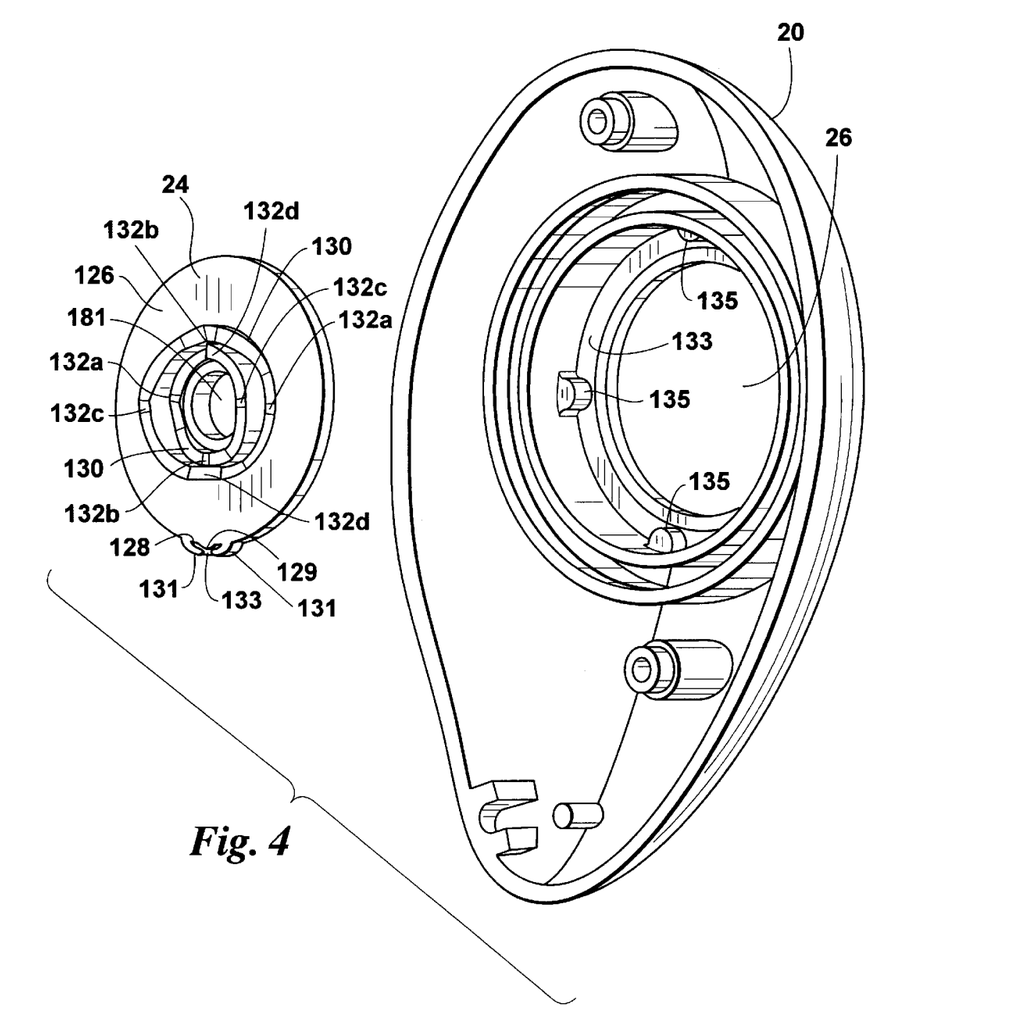
FIG. 4 provides an exploded perspective view showing the right side cover 20 of reel 2 and a dial 24 employed in inventive braking apparatus 1.

As shown in FIGS. 2, 3, and 4, brake dial 24 is a generally circular member including: a rounded forward surface 120 which projects through cover aperture 26; a pair of exterior notches 122 which form a gripping structure in forward surface 120; a forwardly facing radial shoulder 124 surrounding forward surface 120; a flat, rearward surface 126; an indexing structure 128 projecting radially from the outer edge of dial 24; and a pair of concentric cam ramps 130 projecting from rearward surface 126. Each of cam ramps 130 preferably includes a plurality of (preferably 4) flats 132. When dial 24 is positioned in cover 20, dial shoulder 124 slidingly contacts, and is retained by, an interior shoulder 133 formed in cover 20 around aperture 26.

As shown in FIG. 4, indexing structure 128 is preferably a molded structure comprising: an outwardly pointing, V-shaped tab 129; a pair of curved, resilient fingers 131 formed on opposite sides of tab 129; and an indexing notch 133 defined by, and positioned between, fingers 131 and the pointed end of tab 129. As the user turns dial 24, indexing structure 128 successively interacts with rounded, inwardly projecting bosses 135 formed in cover 20. As indexing structure 128 rotates into engagement with any one of bosses 135, the boss pushes the leading finger 131 of structure 128 inward. Thus, as the user continues to rotate dial 24, the boss is received in indexing notch 133. Upon further rotation of dial 24, the boss pushes the trailing finger 131 of structure 128 inward such that the boss is released and the user is permitted to turn the dial to the next succeeding boss 135.

As is more fully explained hereinbelow, the locations of bosses 135 in cover 20 correspond to the rotational positions of dial flats 132. Consequently, indexing structure 128 interacts with bosses 135 to place, and temporarily hold, the inventive braking apparatus in specific, preselected braking positions.

As shown in FIGS. 2 and 3, the cam slider 32 used in the inventive braking apparatus preferably comprises: a substantially cylindrical body portion 136 having a cylindrical bore 138 extending longitudinally therethrough; a circular groove 140 formed around bore 138 in the forward end 142 of cylindrical portion 136; a radial shoulder 144 surrounding the forward end 142 of cylindrical portion 136; and a plurality of (preferably 3) internally threaded bosses 146 projecting rearwardly from radial shoulder 144. Cam slider 32 further comprises a pair of curved cam ramps 148. Cam ramps 148 are positioned in groove 140 for operative engagement with the cam ramps 130 of dial 24.

Brake dial 24 and cam slider 32 are operably positioned and retained within cover 20 by means of a spool retainer 152. Retainer 152 comprises: a central plate 154 having a forward face 164 and a rearward face 168; a pair of radial ears 155 having apertures 156 formed therethrough for bolting retainer 152 to a pair of threaded bosses 158 provided in cover 20; a cylindrical bore 165 formed in forward face 164; a central guide post 162 projecting from forward face 164; and a socket 166 projecting from rearward face 168. Socket 166 holds a bearing 174 in which the end of spool shaft 11 is rotatably received. Cylindrical bore 165 is sized for receiving the cylindrical body 136 of cam slider 32 when slider 32 is moved fully rearward.

As depicted in FIGS. 1, 2, and 3, brake ring assembly 30 includes a contact member comprising a cylindrical brake ring 172 having a cylindrical interior braking surface 175. Brake ring 172 is axially positionable around brake element assembly 28 such that brake elements 34, when projecting a sufficient radial distance from brake element housing 36, will frictionally contact interior surface 175. Brake ring 172 is preferably press fit into a carrying collar 176. Carrying collar 176 includes at the forward end thereof an inwardly extending radial shoulder 178. Apertures 180 are provided through shoulder 178 for attaching brake ring assembly 30 to cam slider bosses 146 by means of bolts 184.

The inventive braking apparatus is preferably assembled such that: brake dial 24 is positioned in cover aperture 26; cam slider 32 is positioned rearwardly of dial 24 such that dial ramps 130 operably interact with slider ramps 148; the guidepost 162 of spool retainer 152 extends forwardly through cam slider bore 138 and into a central bore 181 provided in the rearward face 126 of dial 24; cam slider bosses 146 slidably extend rearwardly through apertures 182 provided in retainer plate 154; and brake ring assembly 30 is reciprocatably secured between retainer 152 and spool 10 by bolting brake collar 176 to cam slider bosses 146. The assembled braking apparatus preferably also includes a spring 188 positioned around retainer guide post 162 between retainer 152 and cam slider 32. The forward end of spring 188 is received in cam slider bore 138 and exerts a continuous biasing force against an interior shoulder 189 formed in bore 138. Thus, spring 188 continuously urges cam slider 32 outward and maintains slider ramps 148 in operative contact with dial ramps 130.

When dial 24 is rotated counterclockwise, dial ramps 130 interact with slider ramps 148 to exert a rearward force on cam slider 32. As a result, slider bosses 146 slide rearwardly through retainer apertures 182. The rearward movement of slider bosses 146, in turn, carries brake ring assembly 30 rearward with respect to brake element assembly 28. By rotating dial 24 clockwise, the user can move brake ring 172 forward with respect to assembly 28.

The positioning of the brake elements 34 in housing 36 operates in conjunction with the axial movement of brake ring 172 to provide a range of brake settings. The longitudinal axes 40 of the brake elements 34 contained in slots 68c and 68b lie in a first plane perpendicular to housing axis 54. The longitudinal axes 40 of the brake elements 34 contained in slots 68c and 68d lie in a second plane perpendicular to rotational axis 54. The longitudinal axes 40 of the brake elements 34 contained in slots 68e and 68f lie in a third plane perpendicular to rotational axis 54. Due to the differing depths of slots 68a–f, the second plane is spaced rearwardly from the first plane and the third plane is, in turn, spaced rearwardly from the second plane.

Embodiment 1 of the inventive braking apparatus thus provides a series of (preferably 4) brake settings yielding sequentially increasing amounts of braking force. The first setting constitutes a noncontacting (nonbraking) position wherein brake ring 172 is positioned fully forward such that none of brake elements 34 can contact brake ring 172. The second setting constitutes a minimal braking position wherein brake ring 172 is moved rearwardly along rotational axis 54 a sufficient distance such that ring 172 encompasses only the brake elements 34 contained in housing slots 68a and 68b. The third setting constitutes an intermediate braking position wherein brake ring 172 is moved rearwardly an additional distance such that ring 172 encompasses the brake elements 34 contained in slots 68a, 68b, 68c, and 68d. The fourth setting constitutes a full contacting (full braking) position wherein brake ring 172 is moved rearwardly a sufficient distance to encompass all of brake elements 34.

Dial ramp flats 132 and indexing bosses 135 are preferably positioned to allow the selection of these predetermined brake settings. To place the inventive apparatus in the nonbraking position, the user simply turns dial 24 such that dial flats 132a are positioned against slider flats 149 and one of bosses 135 is received in indexing notch 133. To select the minimal braking position, the user turns dial 24 such that dial flats 132b are positioned against slider flats 149 and the first succeeding boss 135 is received in indexing notch 133. To select the intermediate braking position, the user turns dial 24 such that dial flats 132c are positioned against slider flats 149 and the second succeeding boss 135 is received in indexing notch 133. To select the full braking position, the user turns dial 24 such that dial flats 132d are positioned against slider flats 149 and the third succeeding boss 135 is received in indexing notch 133. These adjustments are all accomplished without removing reel cover 20 and without disassembling the reel.

As will be understood by those skilled in the art, although the inventive braking element assembly 28 is preferred, other types of braking element assemblies (e.g., radially extending rods having braking weights, pads, and/or bristles slidably mounted thereon) could be used in the inventive braking apparatus. However, regardless of the type of assembly used, it is preferred that some or all of the individual braking elements be positioned at differing longitudinal locations along the assembly's rotational axis. The positioning of the brake elements will preferably be such as to ensure that the brake ring will sequentially encompass additional elements or additional groups of elements as the brake ring is adjusted from a noncontacting position to a full contacting position.

In addition, although the embodiment disclosed herein is shown as incorporated in a contemporary, low-profile baitcasting reel, it will be understood by those skilled in the art that the inventive apparatus can be employed in traditional baitcasting reels or generally any other type of baitcasting reel. Further, it will be apparent to those skilled in the art that the inventive apparatus can be easily reconfigured to incorporate more or fewer braking elements 34.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A braking apparatus for a fishing reel comprising:

a spool assembly mounted in a frame for rotation about a rotational axis, said frame having a side cover thereon;

a brake ring mounted within said side cover for movement along said rotational axis;

a plurality of brake elements mounted on said spool assembly for revolving movement about said rotational axis such that said brake elements can contact said brake ring to generate a braking force and thereby slow said rotation of said spool assembly;

means for moving said brake ring along said rotational axis to selectively place said brake ring in a plurality of predetermined positions relative to said brake elements, said means for moving including a dial positioned in said side cover of said fishing reel such that a user can operate said dial without removing said side cover from said fishing reel and said means for moving further including at least one cam ramp having a plurality of flats thereon corresponding to said predetermined positions;

means for identifying said predetermined positions.

2. The braking apparatus of claim 1 wherein each of said brake elements has a fully extended braking position and said plurality of predetermined positions include:

a noncontacting position wherein none of said brake elements will contact said brake ring, even when said brake elements are in their fully extended braking positions, and at least one contacting position wherein at least one of said brake elements will contact said brake ring.

3. The braking apparatus of claim 2 wherein said predetermined positions include a first of said contacting positions and a second of said contacting positions and wherein, when each of said brake elements is in its filly extended braking position, a greater number of said brake elements will contact said brake ring in said second contacting position than in said first contacting position.

4. The braking apparatus of claim 3 wherein said second contacting position is a full contacting position wherein all of said brake elements will contact said brake ring.

5. The braking apparatus of claim 1 wherein: each of said brake elements has a fully extended braking position; said plurality of predetermined positions include a first contacting position in which, when all of said brake elements are in their said fully extended braking positions, at least one of said brake elements will contact said brake ring; said plurality of predetermined positions also include a second contacting position in which, when all of said brake elements are in said fully extended braking positions, a plurality of said brake elements will contact said brake ring; and wherein a greater number of said brake elements will contact said brake ring in said second contacting position than in said first contacting position.

6. The braking apparatus of claim 1 wherein said means for identifying includes:
   a plurality of bosses in said side cover and
   receiving means, on said rotatable dial, for temporarily receiving said bosses,
   wherein said bosses are positioned such that the receipt of said bosses by said receiving means coincides with the placement of said brake ring in said predetermined positions.

7. A braking apparatus for a fishing reel having a frame and a spool assembly mounted in said frame for rotation about an axis, said braking apparatus comprising:
   a brake ring movable along said axis;
   a plurality of brake elements mounted on said spool assembly for revolving movement about said axis such that said brake elements can contact said brake ring to generate a braking force and thereby slow said rotation of said spool assembly; and
   means for moving said brake ring along said axis to selectively place said brake ring in a plurality of predetermined positions relative to said brake elements,
   wherein said means includes a dial including at least one cam ramp having a plurality of flats thereon corresponding to said predetermined positions.

8. The braking apparatus of claim 7 wherein each of said brake elements has a fully extended braking position and said plurality of predetermined positions include:
   a noncontacting position wherein none of said brake elements will contact said brake ring, even when said brake elements are in their fully extended braking positions and
   at least one contacting position wherein at least one of said brake elements will contact said brake ring.

9. The braking apparatus of claim 8 wherein said predetermined positions include a first of said contacting positions and a second of said contacting positions and wherein a greater number of said brake elements will contact said brake ring in said second contacting position than in said first contacting position.

10. The braking apparatus of claim 9 wherein said second contacting position is a full contacting position wherein all of said brake elements will contact said brake ring.

11. The braking apparatus of claim 7 further comprising retaining means for retaining said brake elements radially about said axis to allow radial movement of said brake elements.

12. The braking element assembly of claim 7 wherein said dial is positioned in a side cover of said fishing reel such that a user can operate said dial without removing said side cover from said fishing reel.

13. A braking apparatus for a fishing reel having a frame and a spool assembly mounted in said frame for rotation about a rotational axis, said braking apparatus comprising:
    a brake ring;
    means for moving said brake ring along said rotational axis;
    a plurality of brake elements; and
    retaining means for retaining said brake elements on said spool assembly for revolving movement about said rotational axis and said retaining means also allowing radial movement of said brake elements such that said brake elements can contact said brake ring to generate a braking force which will slow said rotation of said spool assembly,
    a first one of said brake elements having a first element longitudinal axis lying in a first plane substantially perpendicular to said rotational axis,
    a second one of said brake elements having a second longitudinal axis lying in said first plane,
    a third one of said brake elements having a third element longitudinal axis lying in a second plane substantially perpendicular to said rotational axis, said second plane being spaced apart from said first plane, and
    a fourth one of said brake elements having a fourth element longitudinal axis lying in said second plane.

14. The braking apparatus of claim 13 wherein:
    a fifth one of said brake elements has a fifth element longitudinal axis lying in a third plane;
    a sixth one of said brake elements has a sixth element longitudinal axis lying in said third plane,
    said third plane is spaced apart from said first plane; and
    said third plane is spaced apart from said second plane.

15. A brake element assembly for a fishing reel braking system comprising:
    a housing having a longitudinal axis and a longitudinal end and
    a plurality of brake elements retained in said housing for radial movement relative to said longitudinal axis,
    wherein a first one and a second one of said brake elements are each retained in said housing at substantially a first longitudinal position spaced a first longitudinal distance from said longitudinal end and
    wherein a third one and a fourth one of said brake elements are each retained in said housing at substantially a second longitudinal position spaced a second longitudinal distance from said longitudinal end, said second longitudinal distance being greater than said first longitudinal distance.

16. The brake element assembly of claim 15 wherein a fifth one and a sixth one of said brake elements are each retained in said housing at substantially a third longitudinal position spaced a third longitudinal distance from said longitudinal end, said third longitudinal distance being greater than said second longitudinal distance.

17. A brake element assembly for a fishing reel braking system, said brake element assembly comprising a plurality of brake elements and retaining means for retaining said brake elements about an axis of rotation for radial movement, wherein:

a first one and a second one of said brake elements are each retained at substantially a first axial position;

a third one and a fourth one of said brake elements are each retained at substantially a second axial position; and said second axial position is different from said first axial position.

18. The brake element assembly of claim 17 wherein:

a fifth one and a sixth one of said brake elements are each retained at substantially a third axial position and said third axial position is different from both said first axial position and said second axial position.

* * * * *